US008776941B2

(12) United States Patent
Herzberg

(10) Patent No.: US 8,776,941 B2
(45) Date of Patent: Jul. 15, 2014

(54) ROAD FINISHING MACHINE WITH ADJUSTABLE CONTROL PANEL

(71) Applicant: Joseph Voegele AG, Ludwigshafen/Rhein (DE)

(72) Inventor: Ingo Herzberg, Angelbachtal (DE)

(73) Assignee: Joseph Voegele AG (DE)

( * ) Notice: Subject to any disclaimer, the term of this patent is extended or adjusted under 35 U.S.C. 154(b) by 0 days.

(21) Appl. No.: 13/861,779

(22) Filed: Apr. 12, 2013

(65) Prior Publication Data

US 2013/0292200 A1    Nov. 7, 2013

(30) Foreign Application Priority Data

Apr. 13, 2012 (DE) .................... 20 2012 003 790 U

(51) Int. Cl.
*B60K 26/00* (2006.01)
*B60N 2/14* (2006.01)
*B60N 2/38* (2006.01)
*E02F 9/20* (2006.01)

(52) U.S. Cl.
CPC *B60N 2/146* (2013.01); *B60N 2/38* (2013.01); *E02F 9/2004* (2013.01); *B60K 26/00* (2013.01)
USPC ........... 180/326; 180/328; 180/334; 248/242; 248/276.1; 248/279.1; 280/775

(58) Field of Classification Search
CPC .......... B60N 2/4693; B60N 2/14; B60N 2/38; B60N 2/146; B60K 26/00; E02F 9/2004; B62D 1/18
USPC .................. 180/326, 328, 331, 334; 280/775; 248/125.9, 130, 131, 242, 276.1, 248/278.1, 279.1
See application file for complete search history.

(56) References Cited

U.S. PATENT DOCUMENTS

| 4,580,647 | A  | * | 4/1986  | Peifer et al. ..................... 180/78 |
| 5,632,353 | A  | * | 5/1997  | Kimberley .................... 180/326 |
| 6,186,547 | B1 | * | 2/2001  | Skabrond et al. ............. 280/775 |
| 6,484,987 | B2 | * | 11/2002 | Weaver ....................... 248/278.1 |
| 6,695,270 | B1 | * | 2/2004  | Smed .......................... 248/274.1 |
| 6,709,391 | B2 | * | 3/2004  | Mesaros et al. ............... 600/437 |
| 6,902,016 | B2 | * | 6/2005  | Bares et al. .................. 180/19.3 |

(Continued)

FOREIGN PATENT DOCUMENTS

| DE | 3932600 A1 | 5/1990 |
| DE | 29915965 U1 | 12/1999 |
| GB | 2224559 A | 5/1990 |

OTHER PUBLICATIONS

German Search Report Dated Mar. 11, 2013, Application No. 20 2012 003 790.0, Applicant Joseph Voegele AG, 5 Pages.

*Primary Examiner* — Ruth Ilan
*Assistant Examiner* — Darlene P Condra
(74) *Attorney, Agent, or Firm* — Brooks Kushman P.C.

(57) ABSTRACT

A road finishing machine includes a control panel that can be selectively swiveled about a first swivel axis and a second swivel axis, where one operational control each is provided for the first and the second swivel axes for separately unlocking and/or locking a swiveling capacity around the respective swivel axis. One counter surface is fixed to the control panel for each of the operational controls. The swivel axes can be unlocked by pulling the respective operational control in the direction of the respective counter surface, and the control panel can be swiveled into the same direction.

20 Claims, 8 Drawing Sheets

(56) References Cited

U.S. PATENT DOCUMENTS

| | | |
|---|---|---|
| 7,100,312 B2 * | 9/2006 | Wakitani et al. .............. 37/246 |
| 7,395,894 B2 * | 7/2008 | Jang et al. .................. 180/271 |
| 7,490,571 B2 * | 2/2009 | Luxford .................. 114/144 R |
| 7,568,406 B2 * | 8/2009 | Booher et al. ................ 74/512 |
| 7,681,687 B2 * | 3/2010 | Stander ...................... 180/334 |
| 7,780,131 B2 * | 8/2010 | Oh .......................... 248/276.1 |
| 7,806,224 B2 * | 10/2010 | Maeda et al. ............... 180/334 |
| 7,855,754 B2 * | 12/2010 | Maxson ..................... 348/825 |
| 7,862,084 B2 * | 1/2011 | Maeda et al. ............... 280/775 |
| 7,878,288 B2 * | 2/2011 | Kostak et al. ............... 180/331 |
| 2009/0020673 A1 * | 1/2009 | Dittmer .................. 248/281.11 |
| 2009/0244106 A1 * | 10/2009 | Kuwae et al. ............... 345/690 |
| 2010/0006364 A1 * | 1/2010 | Koutsky et al. ............. 180/329 |

* cited by examiner

ROAD FINISHING MACHINE WITH ADJUSTABLE CONTROL PANEL

CROSS-REFERENCE TO RELATED APPLICATIONS

This application claims foreign priority benefits under 35 U.S.C. §119(a)-(d) to German patent application number DE 20 2012 003 790.0, filed Apr. 13, 2012, which is incorporated by reference in its entirety.

TECHNICAL FIELD

The disclosure relates to a control panel adjustment for a road finishing machine by means of which a control panel can be swiveled about a swivel axis.

BACKGROUND

A control panel adjustment for road finishing machines is known, for example, from DE 299 15 965 U1. The control panel described therein has a transverse guide by which the control panel can be shifted in the transverse direction of the road finishing machine. Furthermore, the depth of the control panel can be adjusted, i.e., into or against the direction of motion of the road finishing machine. Moreover, the control panel has a rotary adjustment device permitting to rotate the control panel about a centrically disposed axis of revolution.

SUMMARY

It is an object of the present disclosure to provide a road finishing machine with a control panel swiveling around a swivel axis, wherein an optimally ergonomic adjustment is permitted by means that are constructively as simple as possible.

The road finishing machine according to the disclosure has a control panel that can be selectively swiveled around a first and a second swivel axis, where for the first and the second swivel axes, one operational control each is provided for separately unlocking and/or locking a swiveling capacity around the respective swivel axis. An embodiment of the disclosure is characterized in that for each of the operational controls, a counter surface is fixed to the control panel and that the swivel axes can be unlocked by pulling the respective operational control in the direction of the respective counter surface, and the control panel can be swiveled into the same direction. This permits a particularly ergonomic and obvious or intuitive adjustment of the control panel as the counter surface firmly fixed to the control panel determines the direction into which the operational control must be moved.

To achieve a particularly ergonomic orientation of the swiveled control panel, the first and second swivel axes can be oriented in parallel.

It is advantageous for the first and the second swivel axes to each comprise a sliding element which is guided in a link. This permits a particularly smooth-running and uncomplicated adjustability of the control panel because the operator of the road finishing machine simply guides the swiveling motion along the link. To keep friction between the links and the sliding elements as low as possible, the respective surfaces can comprise a coating of a nickel-PTFE dispersion (for example AHK NanoDisp PTFE).

It is suitable for the operational controls for the first and the second swivel axes to be separately operated as the driver thus has the possibility of determining himself the number of degrees of freedom into which the control panel can be adjusted. Thereby, unintentional swiveling motions of the control panel can be avoided.

For the operation of the road finishing machine, it is suitable for the control panel to be laterally adjustable along rails in the transverse direction of the road finishing machine. This permits good ergonomics for the driver, whereby the rail guide simultaneously ensures a secure and robust lateral adjustability of the control panel.

It is advantageous for the control panel to also be height adjustable in the axial direction at least along one of the axes. Thereby, the control panel can be adapted to the height of the operator.

To facilitate the actuation of the operational controls for the first and/or the second swivel axes, the control panel can furthermore comprise at least one counter surface. This permits the driver to use the counter surface as a support for his thumb or his heel of hand to be able to more easily pull the respective operational control towards him or push it away. This increases the ergonomics for the driver and simultaneously ensures a preferably secure adjustability of the control panel.

It is also advantageous for the swivel axes to be lockable by pushing away the respective operational control from the at least one counter surface. Thus, an unintentional unlocking of the swivel axes by striking against the operational control is avoided.

Advantageously, the control panel has a main support, a bracket, and at least one connecting member per swivel axis. This permits a maximum number of degrees of freedom for adjusting the control panel and thus optimal ergonomics.

Here, it is particularly advantageous if by the unlocking of the swiveling capacity about the respective swivel axis, the main support can be moved relatively to the bracket.

For a particularly good adjustability of the control panel, it is advantageous for the operational controls to extend over a length which essentially corresponds to the overall height of the main support. This offers a large working surface for the driver to push and/or pull the control panel into a certain swiveling direction.

It is suitable for the swivel axes to be oriented largely symmetrically to a central axis of the control panel to obtain a good orientation of the control panel with respect to the road finishing machine. For a preferably good adjustability of the control panel, it is advantageous for the control panel to be continuously swiveling.

Below, an advantageous embodiment of the disclosure will be illustrated more in detail with reference to the attached drawings.

DETAILED DESCRIPTION

Figure 1:
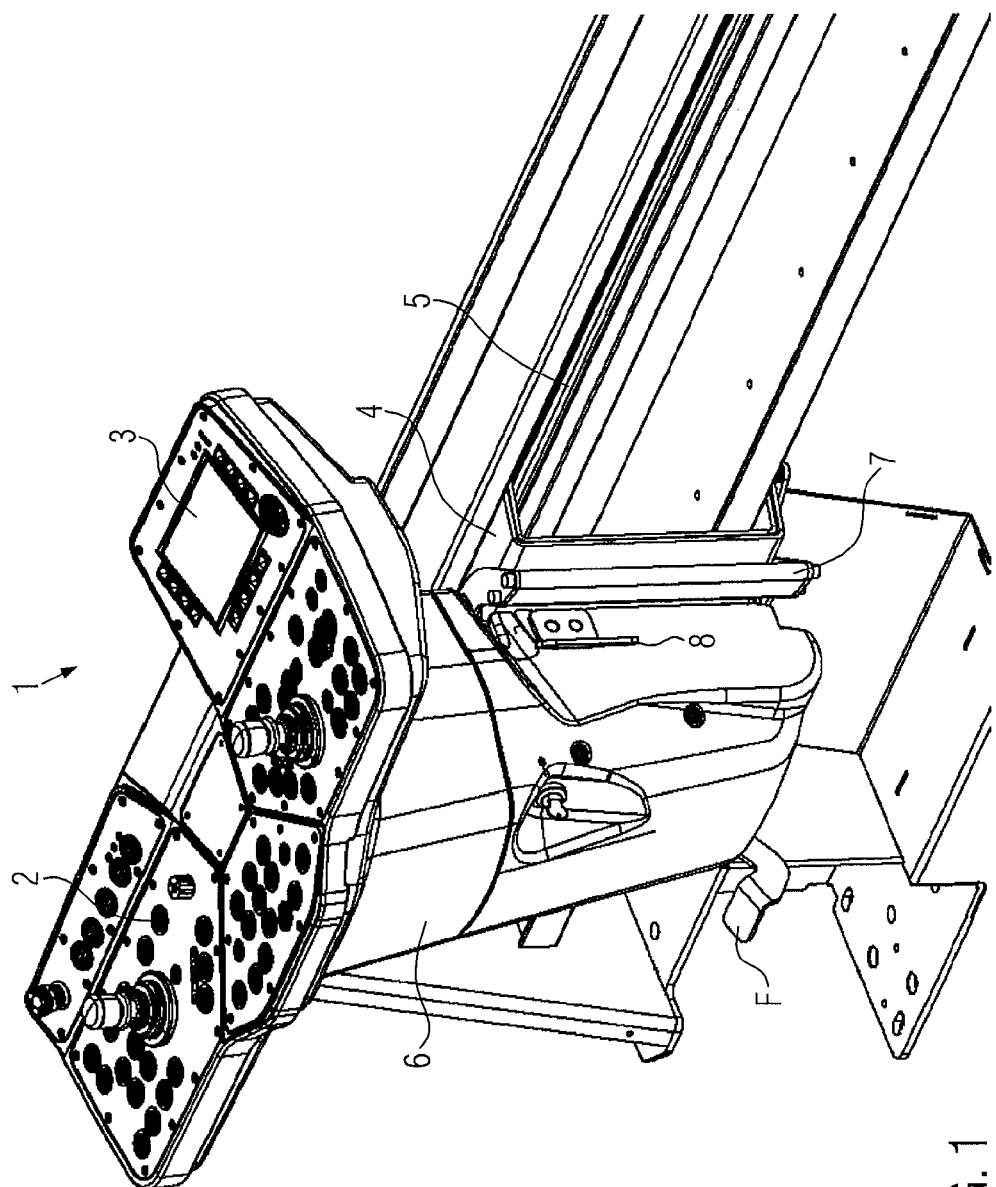
FIG. 1 is a perspective view of a control panel according to the disclosure.

Like components are always provided with the same reference numerals in the figures.

FIG. 1 shows a control panel 1 according to the disclosure in a perspective view which serves the control of a road finishing machine (not shown) and its working components. By means of the control panel 1, the road finishing machine can be moved, for example, in a controlled manner.

The control panel 1 has a plurality of control elements 2 for controlling the road finishing machine, for example operator buttons and/or control sticks. For indicating operating parameters of the road finishing machine, the control panel 1 moreover comprises at least one display panel 3.

One can furthermore see in FIG. 1 that the control panel 1 is fastened to a rail system 5 of the road finishing machine with a bracket 4 such that it can be shifted and fixed. The rail system 5 is firmly fixed to the road finishing machine, for example in its driver stand (not represented). The bracket 4 largely has a U-shaped design and slides along the upper side and the bottom side of the rail system 5. It is thus possible to adjust or shift the bracket 4 and thus the complete control panel 1 in a transverse direction of the road finishing machine. For this, the surfaces of the elements movable with respect to each other, in particular the bracket 4 and the rail system 5, have a surface coating which clearly reduces the friction of the elements. For example, this surface coating can be a nickel-PTFE dispersion (for example AHK NanoDisp-PTFE).

The control panel 1 furthermore has a covering element 6 designed in one or several pieces for covering the mechanical and electric components of the control panel 1 and moreover protect them from external influences. The control panel has an operational control 7 at its side which extends largely vertically along the covering element 6. In this embodiment, the operational control 7 extends over a length which corresponds at least to the width of the rail system 5 to permit the operator of the road finishing machine a preferably large working surface for actuating the operational control 7. Thus, the operator can grip the operational control 7 with both hands or additionally brace his knee against it.

One can also see a counter surface 8 which is also laterally fixed to the control panel 1 or the covering element 6 and is arranged in reaching distance of the operational control 7. The counter surface 8 serves the operator as a support for his thumb or the heel of his hand while the operator is actuating the operational control 7 because, when it is actuated, the operational control 7 either performs a swiveling motion towards the counter surface 8 or away from it. The precise functioning of the operational control 7 will be described in further detail below.

Figure 2:
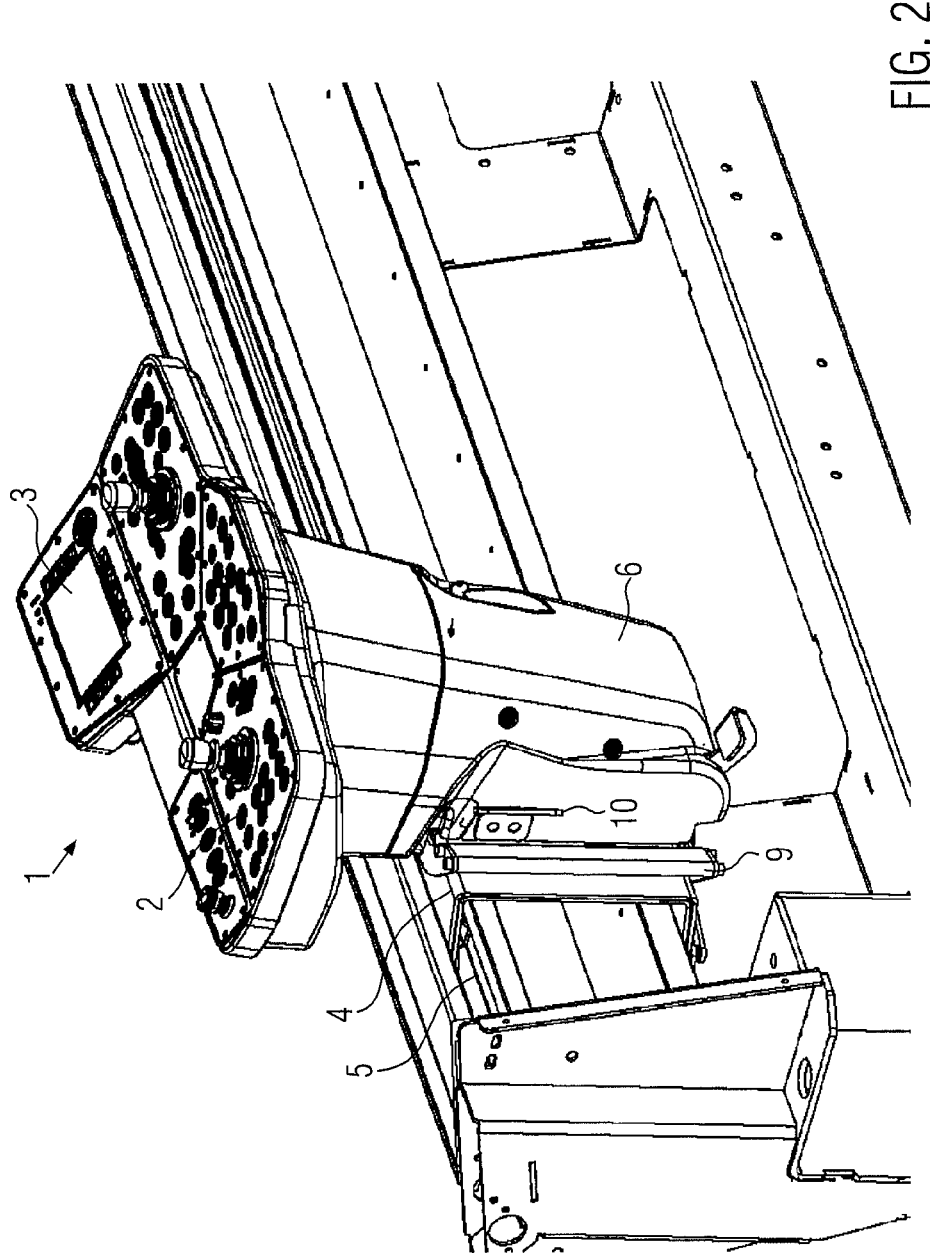
FIG. 2 is a further perspective view of the control panel according to the disclosure.
Figure 3:
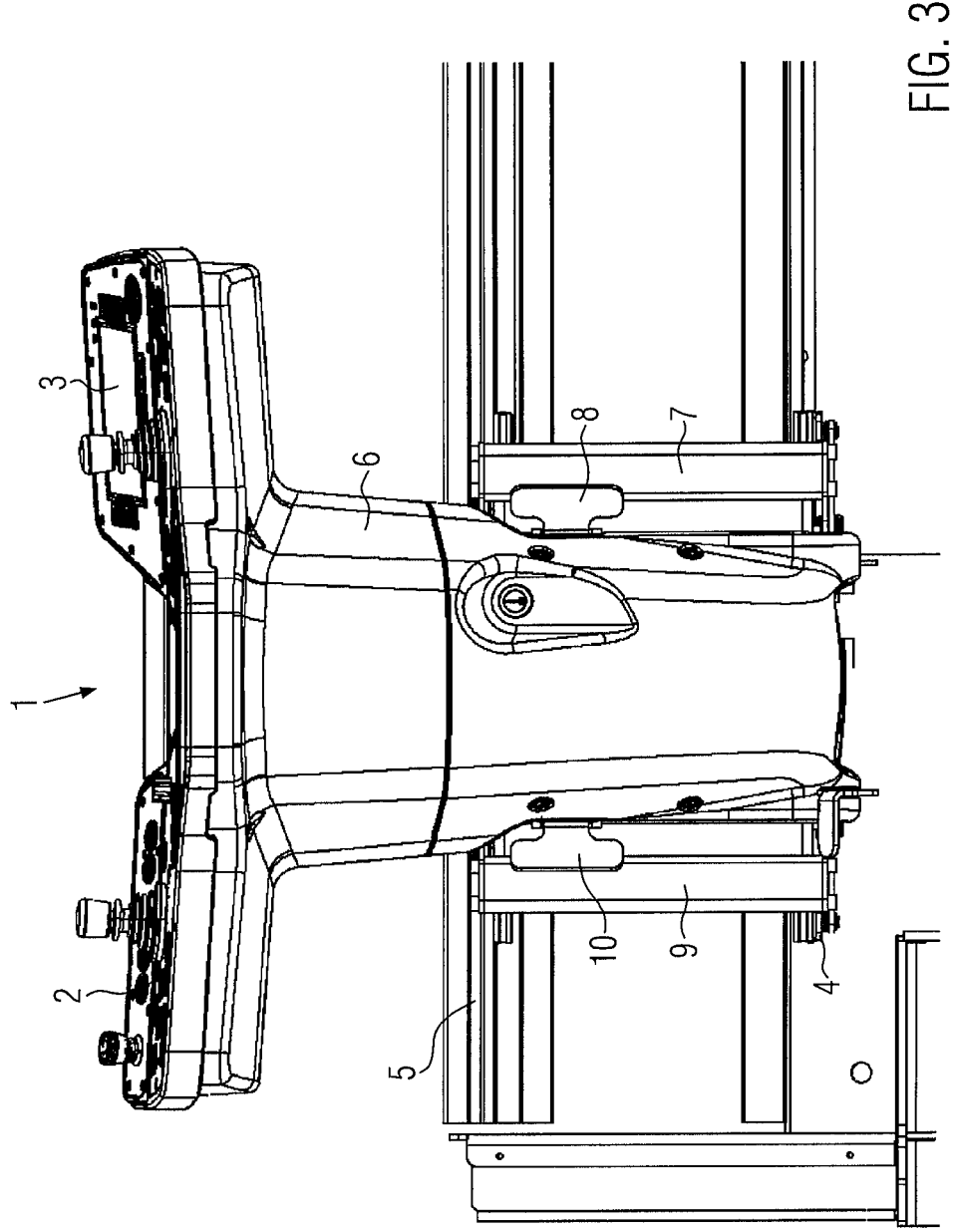
FIG. 3 is a front view of the control panel according to the disclosure.

FIG. 2 shows a further perspective view of the control panel 1 according to the disclosure. One can clearly see a further operational control 9 which extends on the left side of the control panel 1 or the covering element 6 in a largely vertical direction along it. The operational controls 7, 9 are arranged at the control panel 1 approximately symmetrically. On the left side, too, the control panel 1 has a counter surface 10 which serves as a support for the operator's thumb or ball of the thumb when the operational control 9 is actuated. This symmetric arrangement of the operational controls 7, 9 and the counter surfaces 8, 10 can be clearly seen in FIG. 3 which shows a front view of the control panel 1.

Figure 4:
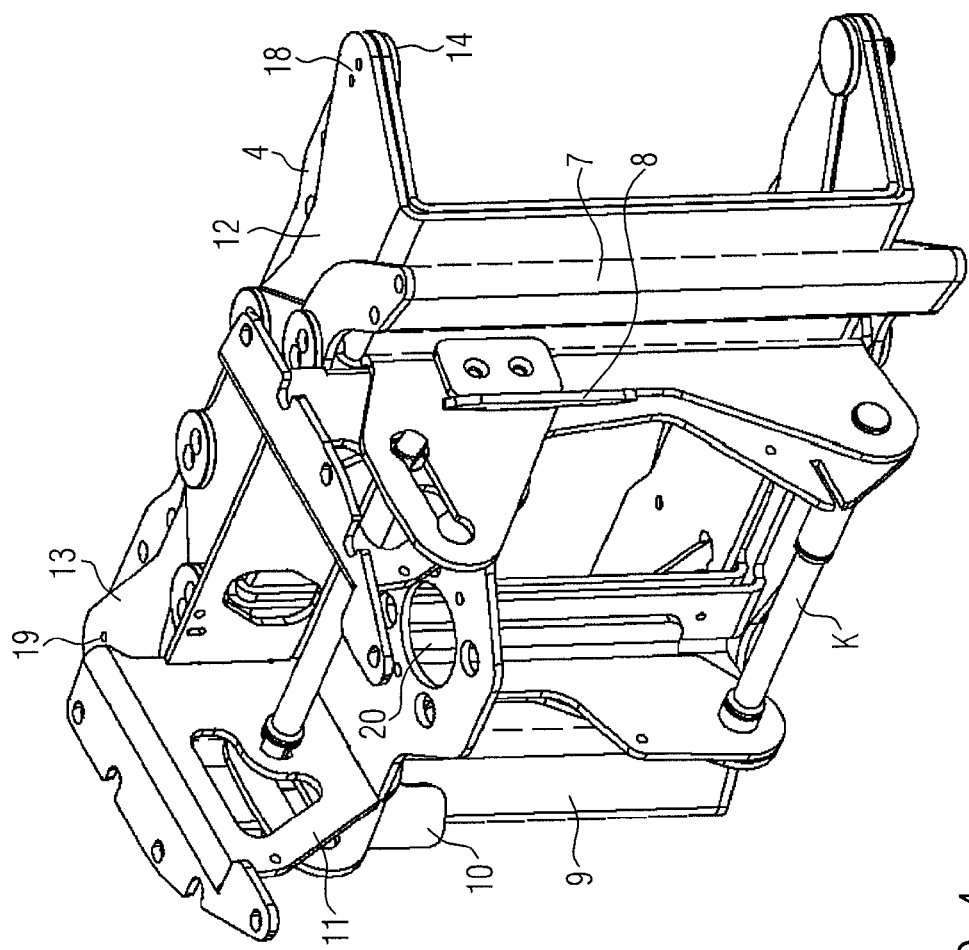
FIG. 4 is a perspective view of a main support, a connecting element and a bracket of the control panel according to the disclosure.

FIG. 4 shows an exposed part of the control panel 1 in a perspective view. One can see the bracket 4 for a rail-guided mounting of the control panel 1 at the road finishing machine. Furthermore, a main support 11 can be seen at which the operational controls 7, 9 and the counter surfaces 8, 10 are arranged. Between the operational controls 7, 9 and the bracket 4, one connecting member 12, 13 each is arranged whose function will be described in further detail below.

FIG. 4 furthermore shows a tipping axle K. The control panel can be tipped forward around this horizontal tipping axle relative to the bracket 4 as soon as the operator has released a locking mechanism (not represented) by actuating a foot pedal F (see FIG. 1) which releasably locks the swiveling capacity of the control panel 1. By means of the locking mechanism, the control panel 1 can be locked, after the pedal F has been released, either continuously or at predetermined tipping angles relative to the tipping axle K.

Figure 5:
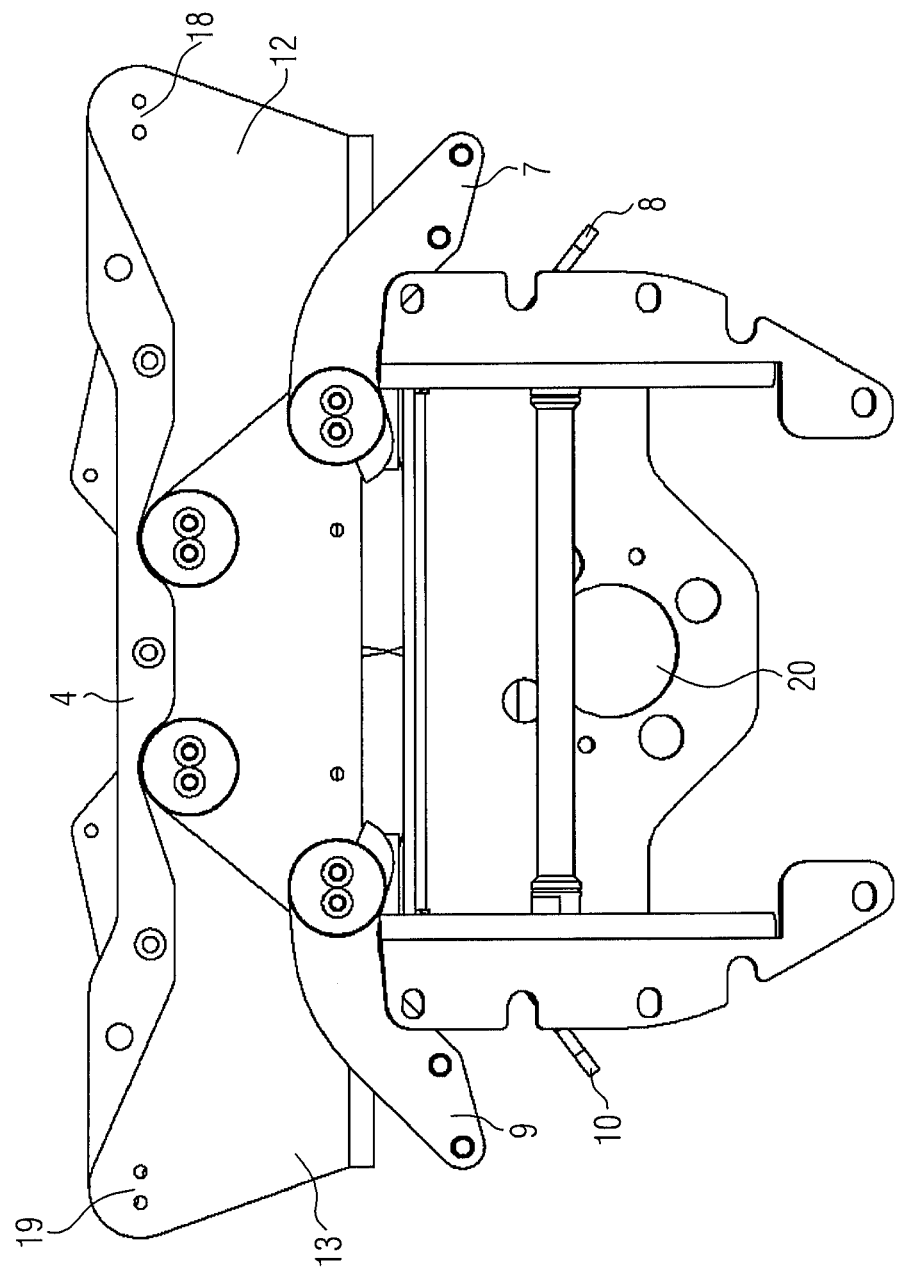
FIG. 5 is a plan view onto the main support of the control panel according to the disclosure in a locked position.

In FIG. 5, which shows a plan view onto the main support 11, the bracket 4 and the connecting members 12, 13, the symmetric arrangement of the operational controls 7, 9 at the main support 11 can be clearly seen. Here, the operational controls 7, 9 are represented in a non-operated position. This means that the connecting members 12, 13 are fixed by the operational controls 7, 9 and are thus immobile with respect to the bracket and/or the main support 11. The moving parts of the control panel do not have any degree of freedom.

Figure 6:
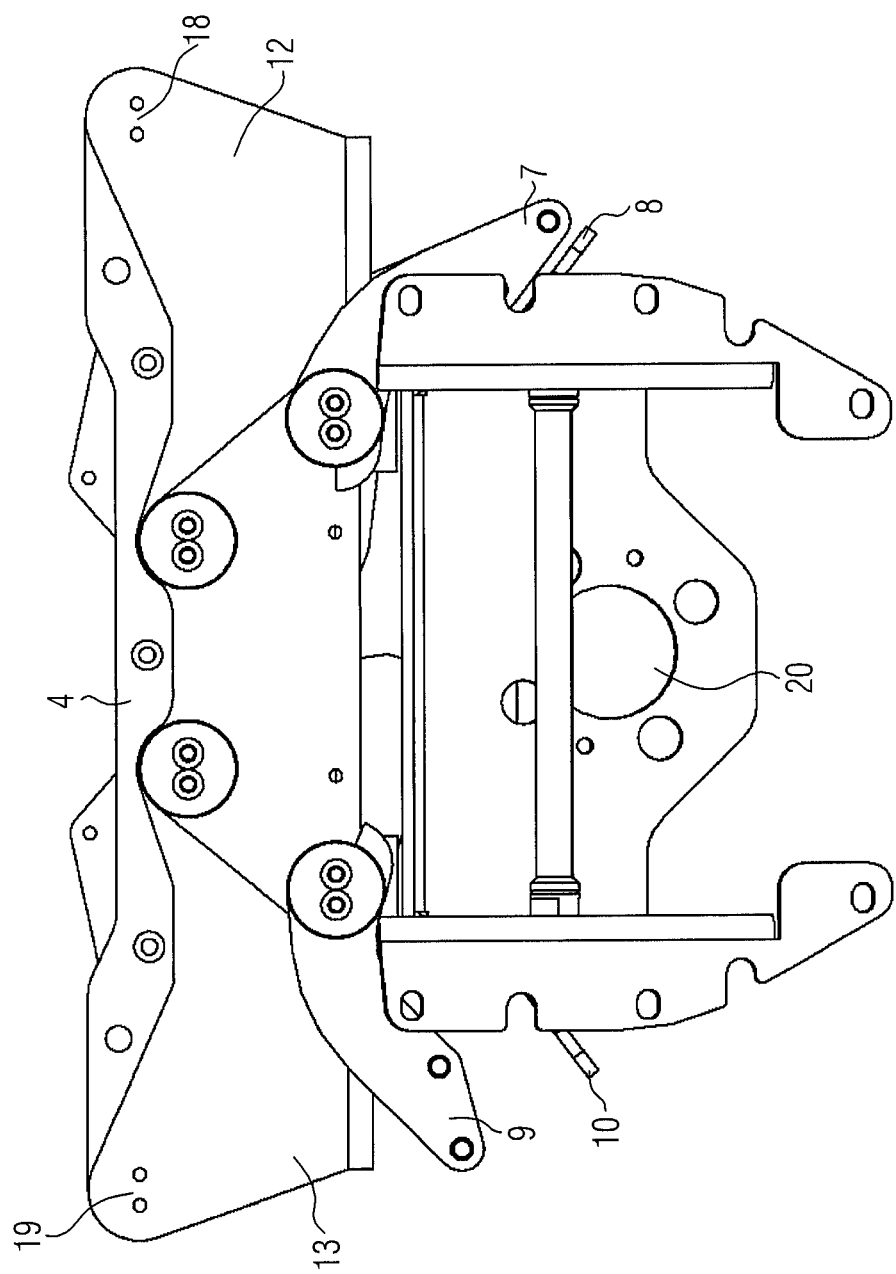
FIG. 6 is a plan view onto the main support of the control panel according to the disclosure in a partially unlocked position.

FIG. 6 shows the arrangement of FIG. 5, also in a plan view, where the right operational control 7 is now in an actuated position. This means that the operator of the road finishing machine has pulled the operational control 7 in the direction of the counter surface 8 to release the connecting member 12 and permit to swivel the control panel 1 to the left, as will be described below. The left operational control 9 is still fixed and does not permit any swiveling motion of the control panel 1 to the right.

Figure 7:
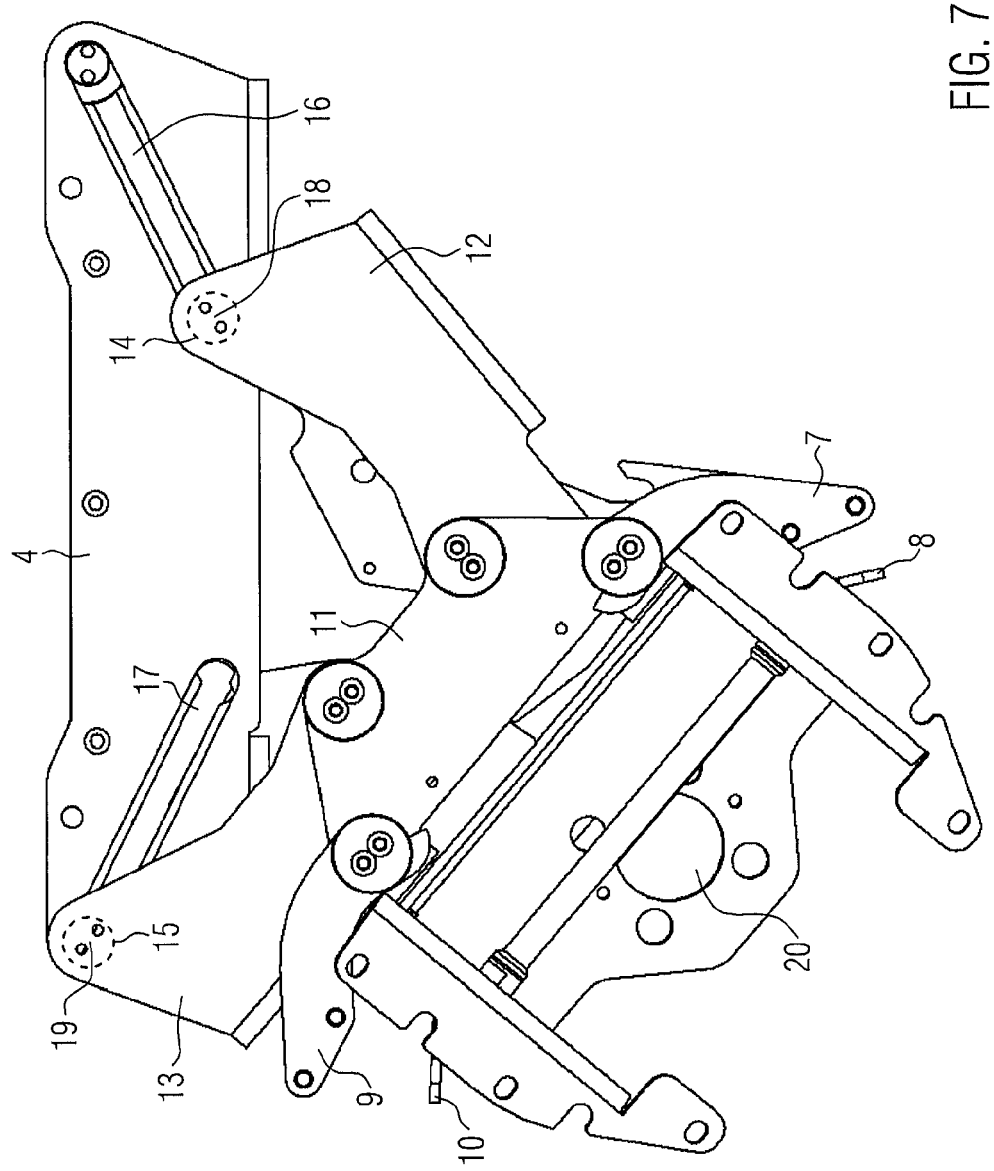
FIG. 7 is a plan view onto the main support of the control panel according to the disclosure in a partially unlocked position and a swiveled position.

In FIG. 7, which shows a further plan view onto the main support 11, the bracket 4 and the connecting members 12, 13, the control panel 1 is shown in a position swiveled to the left. One can clearly see that one region each of the connecting members 12, 13 to which sliding elements 14, 15 are fixed, are each guided in a link 16, 17 of the bracket 4. For example for performing a swiveling motion of the control panel 1 to the left, the sliding element 14 released by the operational control 7 moves along the link 16 whereby the control panel 1 swivels around a swivel axis 19 at the sliding element 15.

One can also clearly see in FIG. 7 that the operational control 7 is still located near the counter surface 8, i.e., the operational control 7 is still unlocked and the connecting member 12 not fixed. To permit the above described swiveling motion of the control panel 1 to the left, the right operational control 7 is actuated and thereby the right connecting member 12 released from the main support 11 to permit a free movement along the link 16 for the connecting member. In the process, the left connecting member 13 also moves along the left link 17, whereby the control panel 1 performs a swiveling motion around the swivel axis 19 at the left sliding element 15.

Figure 8:
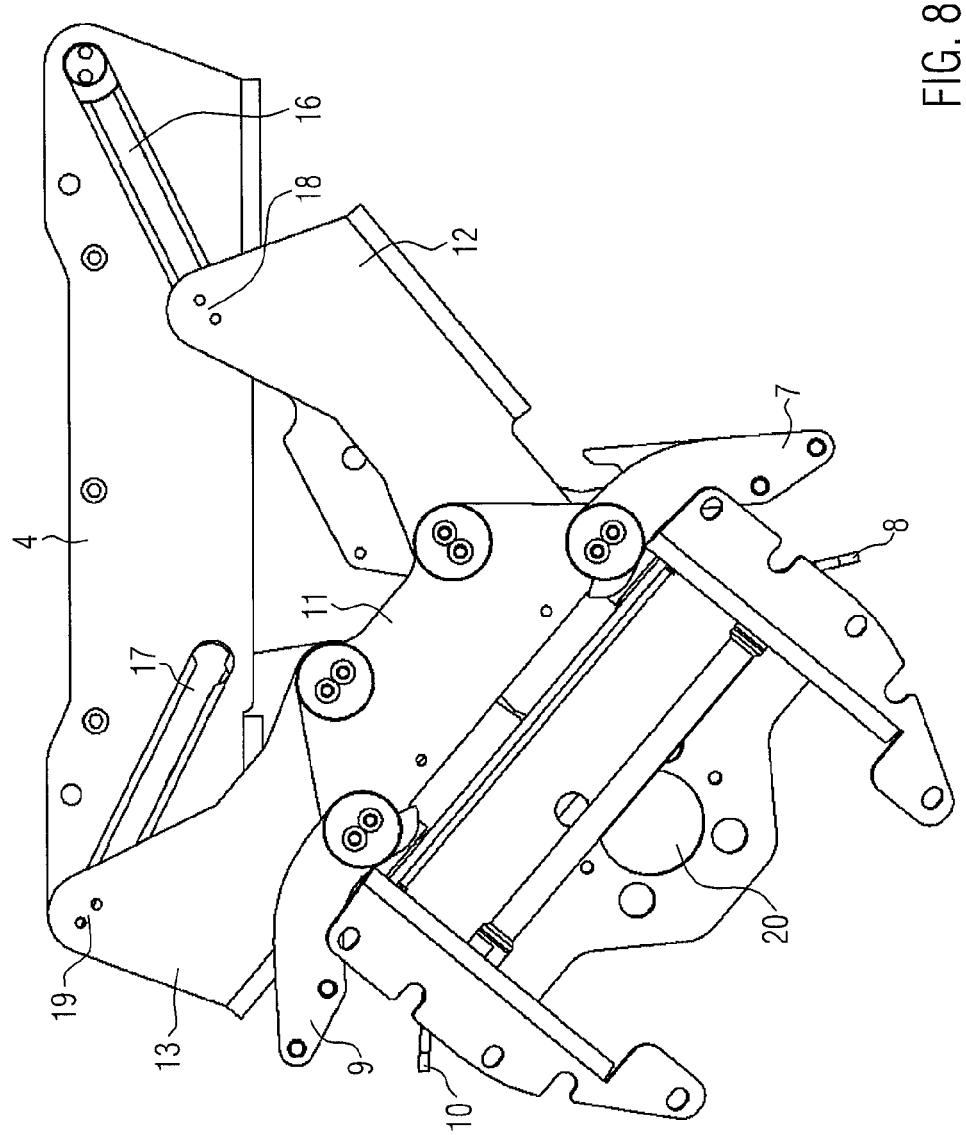
FIG. 8 is a plan view onto the main support and the bracket of the control panel according to the disclosure in a locked position and in a swiveled position.

FIG. 8 shows the control panel 1 of FIG. 7 swiveled to the left in a plan view, where the right operational control 7 is in a locked position. This means that a further swiveling motion of the control panel 1 is prevented by fixing the right connecting member 12 by means of the operational control 7. The arrangement of the bracket 4, the main support 11 and the connecting members 12, 13 does not have any degree of freedom, so that the control panel 1 is securely fixed.

A swiveling motion of the control panel 1 to the right is done analogously to the above-described procedure by releasing the left operational control 9 and a resulting swiveling motion around a swivel axis 18 at the right sliding element 14. Both swiveling motions, i.e., around the swivel axis 18 and the swivel axis 19, can be performed continuously.

Furthermore, at the main support 11 of the control panel 1, an optional mounting 20 for a steering column can be received. The control panel 1 can also be unlocked and height-adjusted in the vertical direction along the swivel axes 18, 19 to additionally increase the ease of operation for the operator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A road finishing machine comprising:
   a control panel that can be selectively swiveled about a first swivel axis and a second swivel axis;
   one operational control provided for each of the first and the second swivel axes for separately unlocking and/or locking a swiveling capacity about the respective swivel axis; and
   a counter surface fixed to the control panel for each of the operational controls;
   wherein a respective swiveling capacity can be unlocked by pulling a respective operational control in a direction of the respective counter surface, and the control panel can be swiveled in the same direction.

2. The road finishing machine according to claim 1 wherein the first and the second swivel axes are oriented in parallel.

3. The road finishing machine according to claim 1 further comprising first and second sliding elements associated with the first and second swivel axes, respectively, wherein each sliding element is guidable in a link.

4. The road finishing machine according to claim 3 wherein the sliding elements and/or the links have a surface coating of a nickel-PTFE dispersion.

5. The road finishing machine according claim 1 wherein the operational controls for the first and the second swivel axes can be operated separately.

6. The road finishing machine according to claim 1 wherein the control panel is laterally adjustable in a transverse direction of the road finishing machine along rails.

7. The road finishing machine according to claim 1 wherein the control panel is height adjustable in the axial direction of at least one of the axes.

8. The road finishing machine according to claim 1 wherein the swiveling capacity can be locked by pushing the respective operational control away from the respective counter surface.

9. The road finishing machine according to claim 1 wherein the control panel comprises a main support, a bracket, and at least one connecting element per swivel axis.

10. The road finishing machine according to claim 9 wherein the main support can be moved relative to the bracket by unlocking the swiveling capacity about the respective swivel axis.

11. The road finishing machine according to claim 9 wherein the operational controls each extend over a length which essentially corresponds to the overall height of the main support.

12. The road finishing machine according to claim 1 wherein the swivel axes are largely oriented symmetrically to a central axis of the control panel.

13. The road finishing machine according to claim 1 wherein the control panel can be swiveled continuously.

14. The road finishing machine according to claim 1 wherein the control panel can be furthermore swiveled about a horizontal tipping axle.

15. The road finishing machine according to claim 14 further comprising a pedal for releasing a lock of swiveling capacity about the horizontal tipping axle.

16. A road finishing machine comprising:
    a bracket;
    a main support that is moveable relative to the bracket;
    a control panel associated with the main support;
    first and second connecting members that are each disposed between the bracket and the main support, the first and second connecting members being movably connected to the bracket such that each connecting member is able to be swiveled about a respective swivel axis;
    first and second operational controls that are each associated with a respective swivel axis for separately unlocking and/or locking a swiveling capacity about the respective swivel axis; and
    first and second counter surfaces associated with the first and second operational controls, respectively, the counter surfaces being fixed relative to the main support;
    wherein each operational control is configured to unlock a respective swiveling capacity when the operational control is pulled toward the respective counter surface to allow the control panel to swivel with respect to the bracket.

17. The road finishing machine of claim 16 further comprising a rail system, wherein the bracket is slidable along the rail system.

18. The road finishing machine according to claim 16 wherein the swivel axes are oriented in parallel.

19. The road finishing machine according to claim 16 wherein the control panel is height adjustable in the axial direction of at least one of the swivel axes.

20. The road finishing machine according to claim 16 wherein the control panel can be furthermore swiveled about a horizontal tipping axle.

* * * * *